United States Patent
Rogers

(10) Patent No.: US 11,145,965 B2
(45) Date of Patent: Oct. 12, 2021

(54) APPARATUS FOR ISOLATING LIGHTING OR OTHER DIRECT CURRENT SURGE BETWEEN RADIO ANTENNA AND COMMUNICATIONS EQUIPMENT

(71) Applicant: Red Cloud Inc., Walnut Creek, CA (US)

(72) Inventor: William E Rogers, Danville, CA (US)

(73) Assignee: Red Cloud Inc., Walnut Creek, CA (US)

(*) Notice: Subject to any disclaimer, the term of this patent is extended or adjusted under 35 U.S.C. 154(b) by 743 days.

(21) Appl. No.: 15/919,055

(22) Filed: Mar. 12, 2018

(65) Prior Publication Data

US 2018/0261915 A1    Sep. 13, 2018

Related U.S. Application Data

(60) Provisional application No. 62/470,284, filed on Mar. 12, 2017.

(51) Int. Cl.
| | | |
|---|---|---|
| *H02H 1/00* | (2006.01) | |
| *H02H 1/04* | (2006.01) | |
| *H02H 3/22* | (2006.01) | |
| *H02H 9/06* | (2006.01) | |
| *H01Q 1/50* | (2006.01) | |
| *H02G 13/00* | (2006.01) | |
| *H02H 9/04* | (2006.01) | |

(52) U.S. Cl.
CPC ............ *H01Q 1/50* (2013.01); *H02G 13/60* (2013.01); *H02H 9/04* (2013.01); *H02G 13/40* (2013.01); *H02G 13/80* (2013.01)

(58) Field of Classification Search
CPC .......... H01Q 1/50; H02G 13/40; H02G 13/60; H02G 13/80; H02H 9/04
USPC ........................................................ 361/117
See application file for complete search history.

(56) References Cited

U.S. PATENT DOCUMENTS

| | | | |
|---|---|---|---|
| 3,905,672 A * | 9/1975 | Anhalt | H01R 13/5205 439/281 |
| 5,911,117 A * | 6/1999 | Bhame | H02B 1/50 379/457 |
| 6,683,772 B2 | 1/2004 | Fowler et al. | |
| 6,785,110 B2 | 8/2004 | Bartel et al. | |

(Continued)

*Primary Examiner* — Jared Fureman
*Assistant Examiner* — Lucy M Thomas
(74) *Attorney, Agent, or Firm* — John C. Merchant

(57) ABSTRACT

The present apparatus, system and method solves the problems of the prior art by enabling substantial dissipation of an electrical energy surge coming from communications antenna which has been struck by lightning. The apparatus is for mounting to an exterior of a building at or near communications antenna also located at the exterior of the building. The apparatus is connected with incoming coaxial cables extending from exterior mounted antenna and with outgoing coaxial cables which extend from the apparatus to communications equipment housed within a communications center. The lighting strike surge travels from antenna, along the incoming coaxial cable and is redirected within the apparatus by polyphasers which trip at capacity to redirect the surge to three separate grounding bars and prevent the surge from continuing along outgoing coaxial cables leading to communications equipment thus safely dissipating surge and shielding communications equipment.

16 Claims, 7 Drawing Sheets

(56) References Cited

U.S. PATENT DOCUMENTS

| | | |
|---|---|---|
| 8,581,115 B2 | 11/2013 | Lawrence |
| 9,099,860 B2 | 8/2015 | Martinez et al. |
| 9,425,614 B2 | 8/2016 | Xiong et al. |
| 2003/0058595 A1* | 3/2003 | Murabayashi .......... H02J 1/102 |
| | | 361/90 |
| 2012/0108083 A1* | 5/2012 | Wittig ................. H01R 12/515 |
| | | 439/78 |
| 2015/0155706 A1 | 6/2015 | Miller et al. |
| 2016/0329703 A1 | 11/2016 | Chawgo |
| 2017/0117700 A1* | 4/2017 | Idota ..................... H01R 31/06 |

* cited by examiner

APPARATUS FOR ISOLATING LIGHTING OR OTHER DIRECT CURRENT SURGE BETWEEN RADIO ANTENNA AND COMMUNICATIONS EQUIPMENT

CROSS-REFERENCE TO RELATED APPLICATIONS

The present invention claims priority to a U.S. provisional application 62/470,284 filed Mar. 12, 2017 by the present inventor.

BACKGROUND OF THE INVENTION

1. Field of the Invention

The present invention is in the field of communications and pertains particularly to apparatus for isolating direct current from a lightning strike or other electrical surge.

2. Discussion of the State of the Art

Lightning strikes are surges of electrical energy with voltage in the millions of volts and a current in the thousands of amperes. Outdoor antennas installed on a roof of a data center or cell towers are vulnerable to lightning strikes. Connected equipment, without adequate lightning protection, is susceptible to severe damage or complete destruction. Replacing or repairing such equipment can be very expensive. Therefore, a lightning protection system should be installed between the antenna and communications equipment. Ideally, when lightning strikes an antenna on the roof of a building, the surge energy is channeled through a lightning protection system to the building ground.

Prior systems for the protection of antennas against lightning strikes are known to include devices that dissipate or redirect the excess energy. Examples of these devices include fuses, filters and surge protectors. Fuses are sacrificial devices that break when too much current flows through them creating an open circuit thereby preventing damage to the rest of the circuit. Filters are designed to allow certain signals through and dissipate or redirect the undesired signals generated from a lightning strike. Surge protectors are devices that protect the connected system from high voltages and currents generated by lightning strikes, transients, and surges. These devices are often constructed using capacitors, inductor coils, gas tubes, and varistors.

An example of equipment grouping might be a radio station, a data center, a news center, a call center, or other such facilities requiring communications or media transfer between remote entities or persons. Connected equipment, without adequate lightning protection, is susceptible to severe damage or complete destruction.

GPS antennas may be arrayed to operate typically outside of the building housing communications equipment such as on the rooftop of the building. There may be one or more than one antenna on a rooftop that may service one or more communications equipment grouping. In a radio frequency (RF) environment the antenna captures and transmits RF signals and the collected information (signals) is carried over a connected coaxial cable, for example, to a connected communications equipment or hardware on a communications network operating within the building.

There is apparatus known in the art for mitigating a sudden electrical surge such as from a lightning strike. Typically, these apparatuses involve one or more surge protection mechanisms mounted between an antenna and a building electrical ground structure that may change state from a relative non-conductive electrical state to highly conductive electrical state in response to an amount of electric surge that would be sufficient to damage communications equipment and or lines.

Several challenges exist relative to current devices that are charged with mitigation of DC surge such as from a lightning strike. One challenge is that current art systems are typically housed within the building hosting the communications equipment and connected to grounding components inside the building. One drawback to this approach is that a DC surge may travel over any conductive path such as a power line and may jump gaps to conductive paths such as electrical wires or cables, metals, conduits, copper water lines, and the like. Another drawback is that when multiple antennas or one of multiple antennas are hit (the DC surge) may not be entirely grounded through one grounding system allowing some of the surge to enter communications equipment lines. Further, after a strike the damage done by the surge reveals what assets were struck so there is no current way of monitoring to determine which of multiple antennas were struck.

Therefore, what is clearly needed is a modular, easily installed system and apparatus for mitigating DC surge from a lightning strike to one or more antennas in a safe manner outside of a building hosting connected equipment bypassing traditional ground structures.

BRIEF SUMMARY OF THE INVENTION

The present apparatus, system and method solves the problems of the prior art by enabling substantial dissipation of an electrical energy surge coming from communications antenna which has been struck by lightning. The apparatus is for mounting to an exterior of a building at or near communications antenna also located at the exterior of the building. The apparatus is mounted between the coaxial cables which extending from the communications antenna at the building exterior and the coaxial cables extending to the communications equipment housed within the interior of the building thus dissipating the surge charge and effectively shielding the communications equipment from the any destructive surge.

In one embodiment, the apparatus comprises a stainless steel enclosure, seamlessly formed and having an opening effectively covered by a hinged door when closed. The interior of the enclosure including door is lined with a layer of durable electrical insulating material such as marine grade plywood.

The apparatus contains an insulated universal power box disposed within the interior space of the enclosure, the power box containing a power supply and connecting electrical power and grounding wires which extend from the power supply through insulated conduit and through insulated outlet at the bottom side of the apparatus. These power and grounding wires are connected to a power fuse panel usually mounted to the exterior of the building.

The apparatus contains at least on DIN rail power supply module connected with the power supply and also connected with one or more high capacity polyphasers mounted on a first grounding bar mounted with and insulated from the interior surface of the enclosure. The first grounding bar is connected by grounding wire to a second grounding bar which is made of copper and mounted with and insulated from the interior surface of the apparatus enclosure. This second grounding bar is made of copper or other material which is higher in conductivity (in weight and/or material)

than the first grounding bar. This second grounding bar is connected by grounding wire to a third grounding bar which equal or greater in conductivity than the second grounding bar. This third grounding bar is also attached with and insulated from the interior surface of the apparatus. A ground wire extends from the third grounding wire through an insulated connector in the bottom of the apparatus and is connected with the building's exterior grounding system.

Each high capacity polyphaser has a power inlet for accepting power from the DIN rail power supply, an incoming coaxial cable port for accepting coaxial cable from the exterior mounted communications antenna, the incoming coaxial cable entering the enclosure through rubber boots located at the bottom side wall of the enclosure, and an outgoing coaxial cable port for connecting coaxial cable extending from the polyphaser through insulated connectors at the bottom side of the apparatus and running to communications equipment located in the interior of the building.

In the present embodiment, each of the one or more polyphasers mounted on the first grounding bar is connected with an incoming coaxial cable coming from a separate communications antenna. As some communications antenna require DC current to run amplifiers mounted on the communications antenna, the polyphaser is, in one embodiment, capable of delivering DC current from the DIN rail power supply through the incoming coaxial cable port and out through the incoming coaxial cable to power the amplifiers. In some passible antenna systems, the polyphaser does not deliver DC current to the antenna.

Each polyphaser has a certain threshold capacity. When operating below capacity, the polyphasers allow RF signal to flow from the incoming coaxial cables, through the polyphaser to the connected outgoing coaxial cables, these RF signals continuing through the outgoing coaxial cables exiting the apparatus and running to the communications equipment located within the building. When a surge caused, in one example, by lighting striking one or more communications antenna connected by incoming coaxial cable with a polyphaser mounted within the apparatus enclosure, is of a strength which meets or exceeds the capacity of the connected polyphaser, the polyphaser acts as a switch and redirects the power surge into the first grounding bar. The surge then continues from the first grounding bar into the second and third grounding bars dissipating substantially within the apparatus enclosure before exiting by ground wire connected from the third grounding and running outside the enclosure and connected with the building grounding system which is, preferably, exterior the building. By directing the power surge into the surge dissipating grounding bar array and away from the coaxial cables extending from the polyphaser to the communications equipment within the building, the apparatus serves to substantially dissipate electrical surge within the apparatus enclosure and effectively shield the communications equipment.

Upon a surge tripping the one or more polyphasers, the RF signal no longer extends through the polyphaser and the system equipment (including sensors, software and other communications equipment) can detect a lack of RF signal being received by the antenna which has been struck. In some embodiments, the system may detect the lack of DC current normally flowing from an untripped polyphaser to the antenna along the incoming coaxial cable. In some embodiments, the polyphaser can be modified so allow current to flow from the polyphaser through the outgoing coaxial cables to the communications equipment and, when tripped, this current will be cut off thus allowing the system to easily detect which of the polyphasers has been tripped.

In still another embodiment, a current may extend from the polyphaser through the outgoing coaxial cables to the communications equipment only when the polyphaser has been tripped to prevent RF and surge capacity from entering the outgoing coaxial cables running to communications equipment. When it is determined by the system that one or more polyphasers has been tripped, either by detection of the lack of RF signals, lack of DC current extending to the antenna, or lack of DC current coming from the tripped polyphaser, the system can make immediate adjustments to replace the damaged polyphasers and otherwise redirect other communications equipment (including antennas not otherwise affected) to receive the RF signals that would have otherwise been received and transported through the struck antenna.

DETAILED DESCRIPTION OF THE INVENTION

In various embodiments described in enabling detail herein, the inventor provides a unique system for protecting communications equipment connected to one or more RF antenna from a surge of direct current (DC) from a lightning strike or other unintentional surge of DC. The present invention is described using the following examples, which may describe more than one relevant embodiment falling within the scope of the invention.

Figure 1:
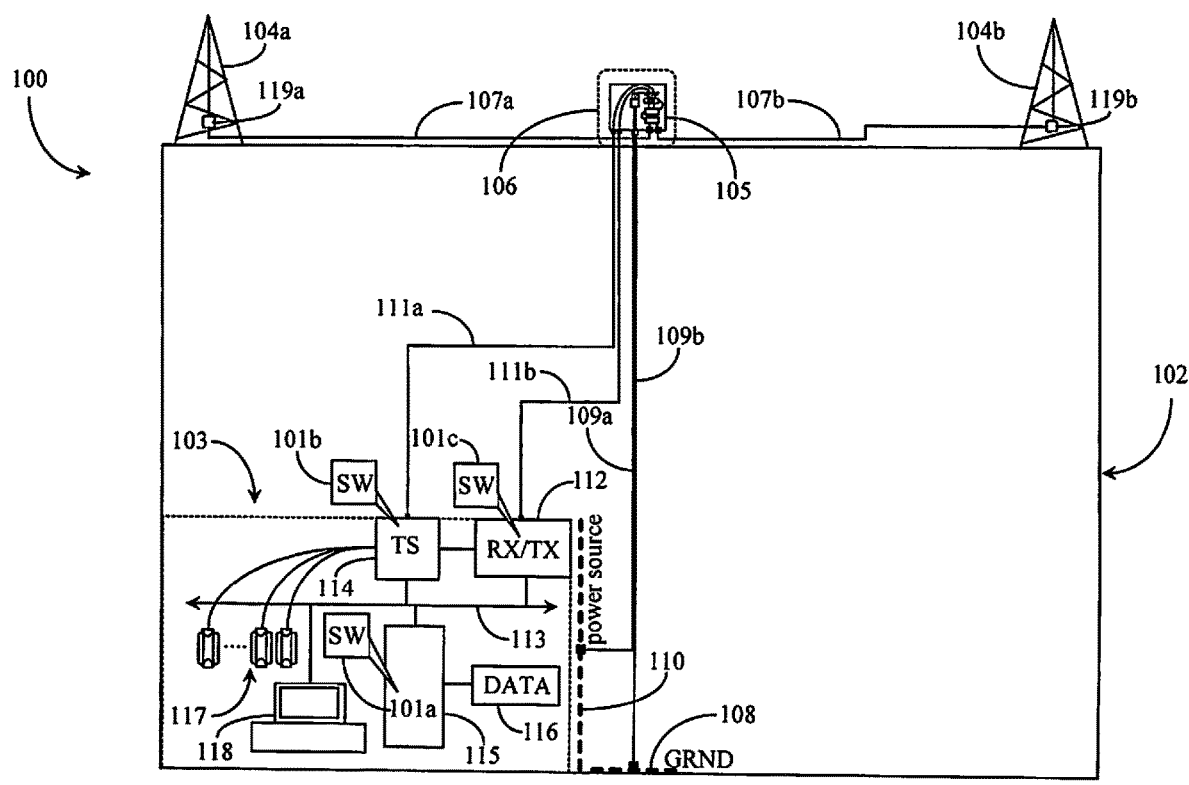
FIG. 1 is an architectural overview of a communications environment protected from lightning strike surge by a modular DC surge protection apparatus according to an embodiment of the present invention.

FIG. 1 is an architectural overview of a communications environment 100 protected from lightning strike surge by a modular DC surge protection apparatus 105 (also referred to herein as a lighting surge protection apparatus or LSPA) according to an embodiment of the present invention. One should note that the protection system, referred to herein as a LSPS (lightning strike protection system) encompasses the LSPA as well as other components including software and sensors which may be described with respect to FIGS. 1-7 below. Communications system 100 includes a building structure 102, within which a communication equipment grouping 103 is maintained for communicating with remote entities such as consumers, customers, subscribers, other business entities, or the like.

Building 102 may house a radio station, a data center, a news center, a call center, or other such facilities requiring communications between remote entities or persons. Communications equipment grouping 103 includes as an example, a local area network (LAN) 113. LAN 113 may support a router (RX/TX) 112 having RF signal/data translation capabilities that has connection to LAN 113 and may route information over the network to a specific destination point on the network such as a server 115 having connection to data repository 116 labeled DATA. Other destination points on LAN 113 may include a computer 118 and a computer integrated telephony (CIT) switch (TS) 114 having connection to one or more telephone handsets 117. The above listed equipment comprising the equipment grouping 103 is presented for example. In alternative embodiments of the system, the equipment grouping might consist of any variety of similar communications equipment. Hereafter, the communications equipment grouping is referred to as the communications equipment 103.

Communications equipment 103 relative to hardware terminals and devices may draw power from an available power source 110 within building 102. Hardware terminals on the network may host network software (SW) applications adapted to enable each terminal to perform their dedicated tasks with respect to communications and data transfer and processing. through instruction and commands. For example, server 115 hosts a SW application 101a, telephony switch 114 hosts a SW application 101b, and router 112 hosts SW 101c. Part of SW function for communications centers includes routing communications, load balancing between terminals, monitoring for network problems, and other functions known to persons knowledgeable in the art.

Radio Frequency (RF) antennas are located on the roof top of building 102 and are depicted herein as antenna 104a and antenna 104b. In the present example, antennas 104a and 104b are located at opposite sides of the building due to their vulnerability to lightning strike. In some real life installations, antennas may be grouped together. In one implementation there might be just one antenna. In another implementation there may be more than two antennas depending upon capacity and the scale of the communications platform within the building. In this implementation each antenna is an active antenna meaning that it is powered for signal amplification. In this example, signal amplifiers or pre-amplifiers 199a and 119b are provided for incoming signal amplification. The antennas may receive RF signals and may pass those signals onto a coaxial cable leading to building equipment. However a passive antenna implementation may also be supported and not necessary be construed as a limitation of the presently described invention. In the case of active antennas such as antennas 104A and 104b, each antenna is equipped with low power amplifiers or preamplifiers 119a mounted to antenna 104a and 119b mounted to antenna 104b. Antennas 104a and 104b require a low DC power from the coaxial cables to power the amps.

In the present example, each antenna 104a and 104b is connected by a coaxial cable and a ground wire to a lightning surge protection apparatus (LSPA) 105. Antenna 104a is connected to LSPA 105 via a coaxial cable 107a and antenna 104b is connected to LSPA 105 via coaxial cable 107b. LSPA 105 is mounted on an electrically insulating pad such as a concrete structure 106 (depicted on FIG. 1 by broken boundary) that may be bolted down to the roof structure and may isolate LSPA 105 from the roof surface or any potentially conductive elements or conduits on the roof.

In a preferred embodiment, LSPA 105 is located up on the roof top near the connected antenna. As noted in FIG. 1, the LSPA 105 is roughly centered in between the two antennas. The actual distance may vary from implementation to implementation. It is noted herein that an important aspect of the present invention is prevention of a DC surge resulting from a lightning strike on either connected antenna from entering building 102 at all or in any amount which may cause damage to the communications equipment 103. LSPA 105 is adapted to be a complete grounding solution that is intentionally isolated within a modified Hoffman style enclosure, which may be described as a modified Hoffman box. Details of the features of the enclosure are provided later in this specification.

Coaxial cables 107a and 107b are routed through annular rubber boots provided through one wall of LSPA 105. The Boots contain foam rubber cushioning at center to isolate the inputs from one another and to provide water tight sealing for weather protection. The coaxial cables incoming into LSPA 105 are each terminated at an inline polyphase surge protection device that is isolated from ground so as not to create a ground loop within the Hoffman style box. It should be noted that the polyphase surge protection device referred to herein as a "polyphaser" is described in the prior art, for example in U.S. Pat. No. 6,785,110 to Bartel et. al. which patent is incorporated herein by reference in its entirety. The coaxial cables running to the polyphaser from the antennas and from the polyphaser to communications equipment are typically approximately seven eighths of an inch in diameter. The coaxial cables leading from the polyphaser to communications equipment are connected in line on the opposite side of the polyphaser and run out of LSPA 105 to connected hardware terminals functioning as communications handlers, for example, receiving radio signal and processing for communications routing and other communications functions. Typical signal processing devices such as a device converting analog signal to digital format, for example, is assumed herein, understood by those knowledgeable within the art.

The physical dimensioning of the Hoffman style enclosure (box) is selected to be approximately three feet by three feet by twelve inches in depth, which provides enough of an air gap to create the resistance needed to prevent an electrical surge from jumping from input coaxial cables leading into the box from the antennas and grounding bars designed to dissipate the surge within the box to output coaxial cables leading to building-hosted equipment. The interior portion of the Hoffman style box contain the input cables from antennas and grounding bars. Polyphasers are sometimes referred to herein as occupying the "unprotected side" of the box while that interior portion of the box containing the cables running out of the polyphasers to building communications equipment is referred to as the "protected side". The polyphasers act as a breaker to prevent the surge from entering the cables on the protected side by redirecting the surge to the grounding bars. If there is not enough air gap (i.e. enough air resistance) between the protected and non-protected sides, the DC surge may jump either into the coaxial cables leading to the communications equipment and thus damage the communications equipment or otherwise into the ground wires running from the power supply box contained within the LSPA 105 to the building ground. The Hoffman style box is fabricated of stainless steel approximately three sixteenth of an inch in wall thickness. It may be noted herein that the cables leading from antennas to LSPA 105 are retained on the roof top and do not enter any portion of the building hosting communications equipment (i.e.

equipment to be protected). In one implementation, the entire inside surface area of the Hoffman style enclosure and the door of the enclosure is overlaid with marine grade dry wood that functions as an insulative surface for mounting components to.

The LSPA 105 may draw power from building power source 110 through a power line 109a that is isolated from ground using a polyvinyl chloride (PVC) conduit. LSPS 105 includes a power ground wire 109b to ground the power supply that is isolated from the power line by a PVC conduit. In this implementation, isolating grounding wires running from power supply using PVC conduit helps prevent potential DC surge from entering the power supply or running to the building ground architecture. Use of traditional metal conduit enclosing both power and grounding wires entering the power supply box would not be enough to adequately isolate the surge.

In the embodiment described and shown by the figures, several coaxial cables enter the Hoffman box, each running from a separate antenna and connecting with a single polyphaser device. In other words, the present implementation describes one polyphaser device per communications pathway to the communications equipment. In an alternative embodiment, the LSPA 105 may be scaled down to a single antenna input and polyphaser or may be scaled up to handle more antennas such as up to five antennas and polyphasers in a single LSPA 105. In an implementation where there are more than five or so antennas, a second LSPA s may be added to handle the coaxial cables coming from the additional antenna(s). In typical implementation, there is a single polyphaser to a single coaxial cable connection to the antenna. The polyphaser may have a high capacity resistance before it may be tripped by a lightning strike. The model number of the polyphaser 209 (see FIG. 2) selected for use is in this embodiment of the invention is a DGX® DGXJ+ 24NFNF-A with a capacity of 800 MHz TO 2500 MHz.

In one embodiment, a DIN rail power supply is provided within the enclosure of LSPA 105 and is wired with power and ground wire to the power outlet within the power box within the enclosure. A DIN power module for each polyphaser may supply a small DC voltage (approximately 12 volts) to at least the coaxial cables 107a and 107b leading to the antenna and preamplifiers 119a and 119b. In one embodiment, a measured amount of DC voltage may be inserted on the center conductors of coaxial cables 111a and 111b to equipment TS 114 and router 112 respectively. Presence of the voltage may indicate that each polyphaser is in an "armed state" (unbroken circuit) allowing signal in from antennas and out to the communications equipment. In this embodiment where DC is supplied to antenna, it may power amplifier components mentioned above that may be used at the antenna. The present invention may be practiced on passive antenna (requiring no power) and on active antenna having amplifier components that require a DC or AC power. Coaxial cables may be TWS-400 flexible ⅞-inch diameter coaxial cable.

In an alternative embodiment, DC voltage may be injected into one or more coaxial cables running from the LSPA 105 to protected equipment. More particularly, from each polyphaser to the communications equipment. In such embodiment where DC voltage is present on the "protected" or communications equipment side (cables 111a and 111b), SW 101a on server 115 may monitor both coaxial lines through local network connection to the specified hardware terminals or, it may be monitored directly at telephone switch 114 by SW 101b and on router 112 by SW 101c. In this way, the entities (SW) responsible for communications operations such as traffic balance and network security may perform emergency or contingency routines such as alternate traffic routing routines, load balancing routines, automated hardware shut down routines, and may propagate alerts to maintenance department personnel as to which antenna were hit by a lightning strike, which polyphaser at which LSPA box requires replacement.

In general operation, when a lightning strike hits an antenna such as 104a, for example, the DC surge may travel over coaxial line 107a through the input boot of LSPA 105 and into an inline polyphaser. The polyphaser changes state to a grounded state relative to an array of isolated ground bars within the LSPA enclosure. The copper grounding bars are connected together and mounted in isolation from the walls and floor of the LSPA enclosure. The polyphaser that is tripped is the polyphaser connected in line with the incoming coaxial cable from the antenna and the outgoing coaxial cable running to the communications equipment.

A polyphaser has an internal process for becoming a path of least resistance to one or more grounding bars. The process to sink to ground is carried out internally as a response to the DC surge capacity and takes only a few nanoseconds after a strike. When the ground bar is operating as a closed circuit under normal conditions, a DC current is inserted into each of the coaxial lines such as lines 107a and 107b that lead back to antenna to power amplifiers 119a and 119b. In this case, when a polyphaser receives DC surge entering from the coaxial cable 107a or 107b running to it from antenna which power surge power level matches or exceeds the polyphaser rating, the polyphaser is triggered to redirect the DC surge onto the grounding bars and cause the polyphaser to no longer insert the DC voltage into the affected coaxial line back to the antenna. In this way, knowledge of which polyphaser was triggered by a surge (i.e. lighting strike) is available as soon as the polyphaser is triggered to open (the open circuit thus breaking the voltage supplied to the antenna when the polyphaser is in a closed state). With active antenna DC loss and signal loss may be monitored with passive antenna there is no DC insertion to the antenna so signal loss on a communications channel is the only way to determine a polyphaser has shut down.

Once a polyphaser is triggered, it does not reset to a closed state (i.e. it is not recoverable or resettable) and must be replaced with a new polyphaser. The DC from the surge takes the available path of least resistance which, in this embodiment, is into a first ground bar upon which the polyphaser is mounted and then into a second ground bar connected with the first by a wire and then a third ground bar connected to the second by a wire. All the ground bars are isolated from the sides and floor of the enclosure but wired together using #2 AWG ground wires. In one implementation, a small DC voltage may also be inserted into the coaxial cables leading to the protected communications equipment as an indication of a healthy polyphaser. This DC voltage may power a sensor or a light emitting diode (LED) and may be easily monitored from the equipment side by SW 101a, 101b, and 101c.

When there is an absence of inserted DC in a coaxial cable leading from a polyphaser to an antenna (due to a surge from lightning strike causing the polyphaser to trigger), the absence of DC may provide an indication to a communications controller of the location of the strike (based on the particular antenna connected with polyphaser tripped). Any DC voltage on a coaxial cable will be interrupted if a lightning strike occurs until a damage assessment and rectification occurs such as replacing a polyphaser and inspecting and repairing the antenna if required.

Figure 2:
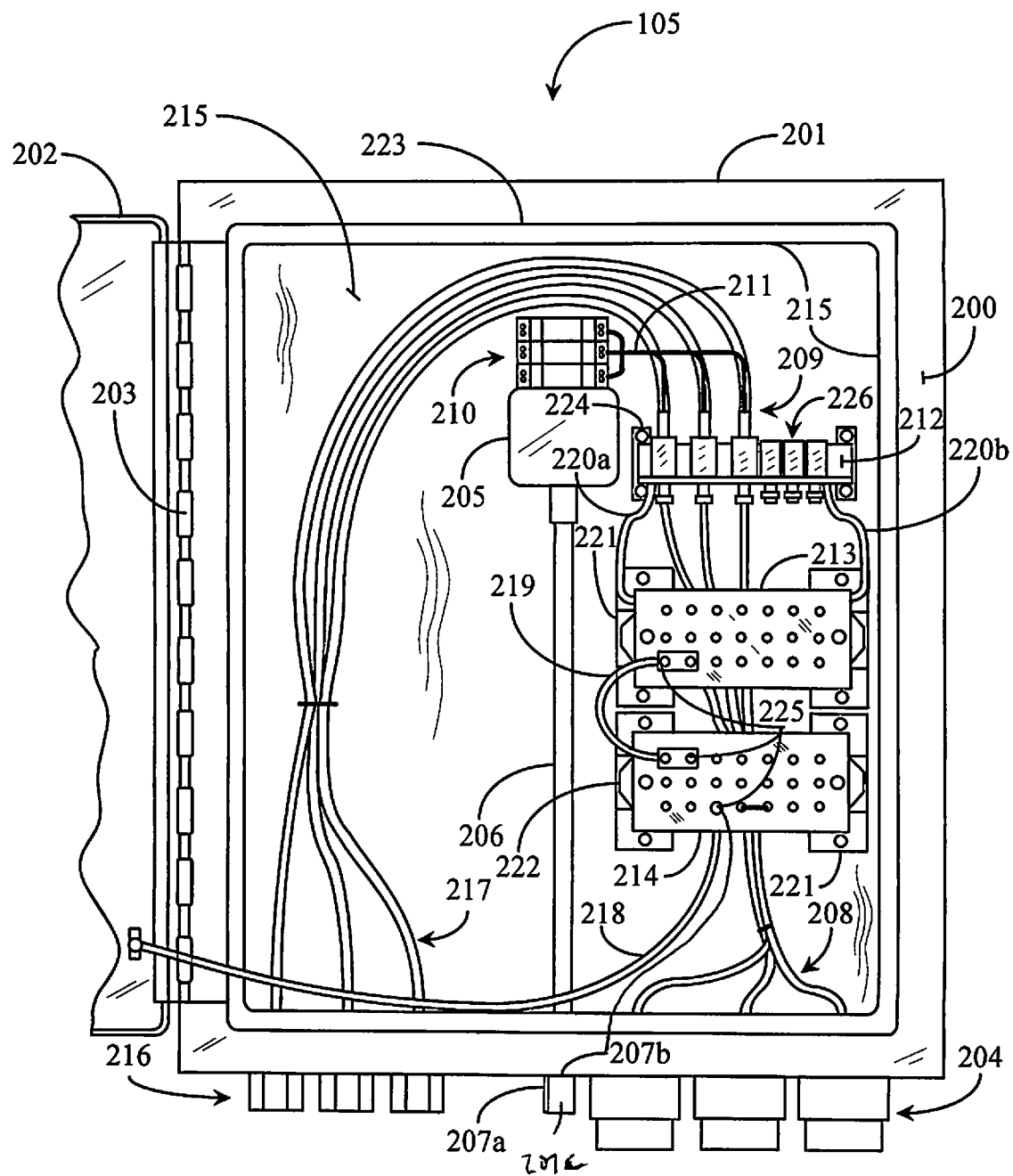
FIG. 2 is a partial overhead view of the modular DC surge protection apparatus deployed as a stainless-steel enclosure containing and isolating the DC grounding components.

FIG. 2 is a partial overhead view of the lighting strike protection apparatus LSPA 105 including modified stainless-steel Hoffman style enclosure containing various components. The LSPA 105 shown includes a fabricated stainless-steel Hoffman style enclosure or box 201 referred to in the art as a Hoffman box modified to practice the present invention. The box 201 shown is rectangular including a top, a bottom, opposing right and left sides, a back, and a front side having an opening 223 for accessing the interior. Surrounding the opening is a lip which extends around the circumference of the opening. Box 201 includes a door 202 connected along one side of the box by a piano type hinge 203. The door 202 is large enough to fit over the lip and adequately seal the interior of the box without providing gaps or spaces when in closed position over the opening. The box 201 may have a uniform three sixteenth of an inch wall thickness including the floor thickness and the door thickness. In a preferred implementation, the inside walls, floor and door of box 201 are lined with a layer of marine grade plywood 215 adding insulative properties to the enclosure.

Box 201 is designed to include a perimeter surface 200 around a uniformly raised rectangular opening 223 to act as a seat for door 202. The external dimensioning of surface 200 exceed that of door 202 to provide surface area for mounting locks to secure the door down over the enclosure opening (locks and lock mounts not illustrated). One or more rubber gaskets (gaskets not illustrated) might also be provided around the lip or interior surface of the door 202 to help provide adequate seal of the door 202 over the box opening 223. In a preferred implementation, fastening bolt-seat sets or bolt sets for securing brackets to mount internal components are welded to the inside stainless steel surface of the back side (in this embodiment the interior stainless steel surface on the back side and opposite the box opening, the steel surface also having a layer of marine grade plywood 215) of box 201 so the insulative integrity of the box is maintained and any surge entering the box is maintained within the box and does not out of the box from electrically conductive connectors that would otherwise penetrate the stainless steel. Therefore, openings are not provided through the walls of box 201 except at the designated locations for input cables (leading into the box from antenna), output cables (leading out of the box to communications equipment), and power/ground lines running to and from a power module mounted within the box. Designated relief locations are assumed in the wall-interfacing side of the marine grade plywood 215 to provide room for the welded implements such as bolts or bolt-seats and access through the marine grade wood lining 215 into such bolts or bolt-seats for mounting fasteners.

LSPA 105 includes an insulated duplex power box 205 mounted to the interior back side over the plywood lining 215. Power box 205 is preferably made of PVC or similar nonconductive material and of a size and configuration which would accommodate power supply components compliant with various international power component codes. The power box 205 contains at least one power outlet component (not illustrated) that may provide power to a DIN rail power supply module set 210. DIN rail may be approximately one inch wide and long enough to mount the power supply modules that power polyphasers 209. In this implementation, the power supply is a Mean Well DR-15-12 Single Output Industrial DIN Rail power supply. Also in this implementation, there are three power modules 210 (mounted on DIN rail adjacently), one for each polyphaser 209. The power and ground wires (not illustrated) are contained within PVC conduit 206 leading out of box 205 to the lower edge of the enclosure. In one embodiment, the ground wire may be separated from the power wire at the edge of the enclosure and fed through separate PVC conduits 207a and 207b, one for power and one for ground. This effectively isolates the ground wire from the power wire to further reduce a chance of DC surge entering the ground or power out to protected equipment.

As noted above, the power and power ground line to power box 205 runs in its own conduit 206 which is connected to an insulated connector at the bottom of the box 207a. A separate ground line 207b may be connected with the third grounding bar and extend out of the box at connector 207c where it is then connected to a building system ground attached to the exterior of the building. By extending a ground wire from the third grounding bar to the building system ground (located outside the building), the surge is directed through the three ground bars toward a building ground which not only dissipated surge before exiting the box to the building system ground, but effectively directs the surge out of the box and away from the exiting coaxial cables leading to the communications equipment. Preferably, conduit 206 and connections 207a and 207c are made of PVC or other nonconductive and electrically insulating material. In the present embodiment, PVC replaces conductive flex conduit that would ordinarily be used by prior art systems to enclose both the power line and ground wire together. The dedicated arrangement (separate conduits for each line) helps to prevent any DC surge from entering the building through power or ground from power box 205. Power and ground lines run from the power supply component (not shown) contained within the power box 205 to separate power supply modules mounted within DIN set 210 to power each polyphaser. Each module 210 may be adapted to provide DC of an approximated amount such as 12 volts to the connected polyphaser 209 over separate wires 211.

Each of the three polyphasers 209 depicted in FIG. 2 have stainless steel housing, a coaxial DC input port, a surge port (input coaxial from antenna), and an output port (coaxial to equipment). Further detail concerning the makeup and function of the polyphasers is described within U.S. Pat. No. 6,785,110 to Barel et. al. incorporated herein by reference in its entirety. As shown in FIG. 2, each of the three polyphasers is attached to an eight hole grounding bar 212. The DC input port on each polyphaser 209 is routed internally and connected in this example to the input coaxial cables 208 which extend into the LSPA 201 box through boots 204 located on the bottom side of the box. These input cables 208 would deliver the DC surge from the antenna struck by lightning to the polyphasers. A coaxial cables 217 connected with each polyphaser at an output port and extend from the polyphaser to the opposite interior portion (with the power conduits providing a general division line) of the LSPA 201 box where they are fed through PVC conduit running to the communications equipment in the building. PVC conduit is used as a further safe guard against a DC surge traveling into the building from the LSPA 201.

Polyphasers 209 are mounted onto a first eight-hole ground bar 212. First ground bar 212 may be a tin plated or a steel ground bar or a mix of steel and copper. In this embodiment, first ground bar 212 is of the form of a right-angle bracket approximately ten inches long, one and one-half inches wide, two inches high, and one eight of an inch thick. These dimensions may be approximate and may vary somewhat without departing from the spirit and scope of the present invention. First ground bar 212 has one side mounted horizontally over a pair of insulative standoff cushions (cushions not visible) to isolate the first ground bar from at least a pair of lower mounting brackets 224. The vertical side of the first ground bar includes the required openings to allow pass-through of the coaxial cables 208 extending from the antennas through the rubber boots 204 at the bottom of the LSPA 201 and connecting with the surge port of the polyphaser 209 mounted on the first ground bar 212. An RF signal path is provided internally to the polyphaser 209 to enable an RF signal from the antenna to proceed through the polyphaser and into the output coaxial cables 217 running from the polyphaser 209 and out of the LSPA 201 box to the communications equipment. It is noted herein that each antenna is grounded to the grounding array within the LSPA enclosure using AWG #6 ground wire (not illustrated in this view). The wires passing through their respective boots with the associated cable (see FIG. 3) and connected to grounding bar 214. Depiction of the ground wires incoming from the antenna is provided in FIG. 7 of this specification.

The isolated first ground bar 212 is connected by an AWG ground wire 220a (#2 wire) and an AWG ground wire 220b (#2 wire) to a second ground bar 213 made of copper. The copper second ground bar 213 may be approximately ten inches long, four inches across, and five sixteenth of an inch or so thick. The copper second ground bar 213 is mounted horizontally over a pair of insulative standoff cushions 222 and to a pair of lower brackets 221 which are in turn mounted to bolt-seats or inverted bolts welded to the inside surface of the bottom side of the LSPA 201 box. In a preferred embodiment of the present invention, SST wood lag bolts are used to secure mounting brackets such as mounting brackets 221 against the wood.

Cushions 222 and the cushions isolating the first ground bar may be fabricated of rubber or another insulator known in the art that provides an isolation gap between the ground bar and lower brackets. Copper second ground bar 213 is connected to a third grounding bar 214 also made of copper by an AWG ground wire (#2) 219 at one side of the second and third grounding bar. Copper ground bar 214 may be the same (identical design) bar as copper ground bar 213 and may be identically mounted horizontally over cushions 222 to lower brackets 221. Copper ground bars 213 and 214 include a plurality of threaded openings for attaching grounding wires and through-holes at each end for accepting screws or bolts for mounting. The stainless steel (SST) door 202 of LSPA box 201 is grounded to copper grounding bar 214 by an #6 AWG ground wire 218. Therefore, the LSPA box 201 is grounded to the internal grounding bars (212, 213, and 214) when the door 202 of the box 201 is closed and also when the door 202 is open.

In the implementation shown, there are 21 openings or holes in each of the second and third copper grounding bars (213 and 214) and two holes for mounting the grounding bars to the box 201. Copper grounding bars 213 and 214 are approximately 10 inches by 4 inches by $5/16^{th}$ to perhaps one quarter of an inch thick. Consideration of suitable grounding bar apparatus and dimension is made by the inventor based on total ground material volume to box size and the number of lines 208 serviced by the LSPA 200. In this case, two identical copper grounding bars (213 and 214) are available to the inventor are used in the presently described embodiment, but this should not be construed as a limitation on size and shape of the grounding bars as other sizes and shapes of grounding bars may be substituted therefor without departing from the principles and scope of the present invention. For example, a single bar might be used in place of two identical bars whereas the material volume is roughly equal.

It is noted that special consideration is made relative to the conductive materials used for the various grounding screws which connect the ground wires and other ground implements to copper grounding bars 213 and 214. In a preferred embodiment, the ground wires and other ground implements are connected to grounding bars 213 and 214 using silicon bronze 651 screws which are more conductive than stainless steel screws and thereby aid in establishing and maintaining a least resistant path for the DC surge to travel to and across the ground bars and to remain in the ground bars while the electricity is dissipating.

In the present embodiment shown in FIG. 2, the LSPA 105 has three input lines and three output lines requiring three polyphasers and three DIN power modules. The LSPS 105 depicted in FIG. 1 has only two inputs, two outputs, and two polyphasers to illustrate flexibility of application. Although the preferred dimensions of the LSPA box 201 used in this embodiment have the dimensions 3'×3'×1', a much smaller box may be used for an implementation having a single input and single output with a single polyphaser. Such implementations may further include a vertical insulative separate barrier (or separation wall) within the Hoffman box that may also be lined with marine grade plywood to insulate DC surge contained and grounded within the box. The insulative separation barrier may compensate for a reduced "air gap" (i.e. the resistance provided by air space between the protected and nonprotected sides) in a smaller enclosure. The separation barrier or wall may be installed between the grounding bars and the output cables to the equipment. The footprint of the inside of the LSPA box 201 at approximately 3'×3' in the example shown by FIG. 2, allows a sufficient amount of insulative air space to lie between the grounding bar array and the output coaxial cables to reduce the potential of a DC surge jumping through the air from the grounding bars and into the output cables running toward the communications equipment located within the building.

In a preferred embodiment, the LSPA 105 may be provided as a universal kit containing different optional power connectors and components for the power box that may be called for in a region such as outside of the United States. Universal hole patterns for electrical implements such as outlets are also provided to eliminate fabrication tasks during installation. It may also be noted that installation is much simpler for contractors because they may simply mount the LSPA box 201 on an insulative barrier pad or slab 106 (FIG. 1) and provide the PVC conduits where suggested to separate power and ground to the duplex power box 205 (FIG. 2) and are not required to ad hoc install or to determine ground wire gauge or other considerations that might otherwise be expected of an electrician.

Figure 3:
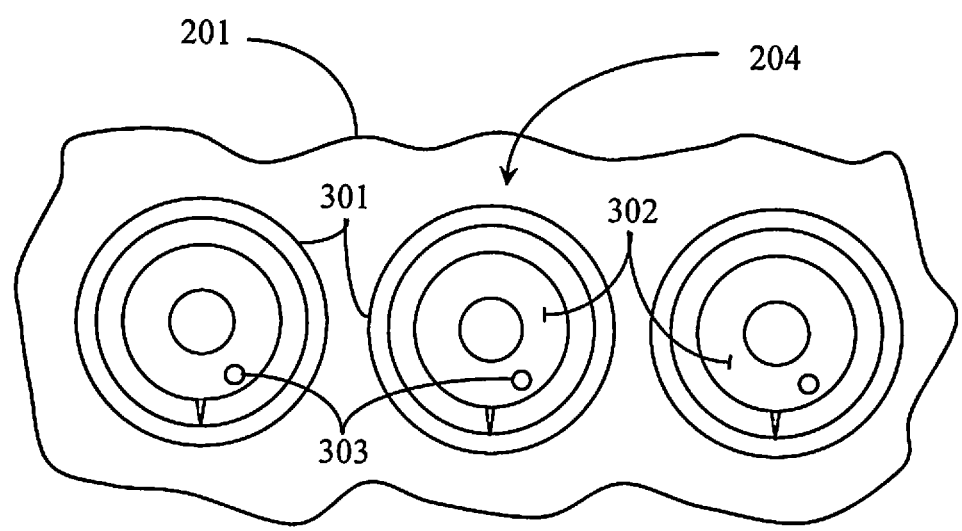
FIG. 3 is an enlarged elevation view of the set of rubber boots of FIG. 1 according to an embodiment of the invention.

FIG. 3 is an enlarged elevation view of the set of rubber boots 204 of FIG. 2 according to an embodiment of the invention. Rubber boots 204 are designed to protect the interior of the Hoffman box 201 from the elements and specifically to prevent any gaps in the box where the cables 208 leading from the antenna come into the box enclosure. The boots may be fitted over a preformed or fabricated form or mounted tubular form (not visible) and threaded or otherwise affixed to the bottom side of the box 201 using standard hose clamps (clamps not illustrated). The actual rubber boot material 301 encases a more porous rubber foam cushion 302 that includes a central opening 304 that may expand out to approximately seven eights of an inch for accepting the coaxial cables 208 leading from the antenna.

Boots and cushioning provide more insulative separation between coaxial cables at the incoming plane into the box. Each rubber cushion 302 of each boot 301 includes a pre-drilled opening for insert-through of a #6 AWG ground wire (one to each antenna). Ground wires to antennas are connected to one of the isolated copper ground bars within the enclosure. The coaxial cables leading to the equipment into the building are further insulated as an added precautionary measure from possible DC surge infiltrating the interior box enclosure 201 via PVC conduits 216 (see FIG. 2). The material rubber should not be considered a limitation relative to boot material as other insulative materials known in the art might also be used without departing from the spirit and scope of the invention. Rubber is a good insulator and has the elastic properties desired to form tightly around the cables and wires passing through the boot while still protecting the interior e of the box from the external elements.

Figure 4:
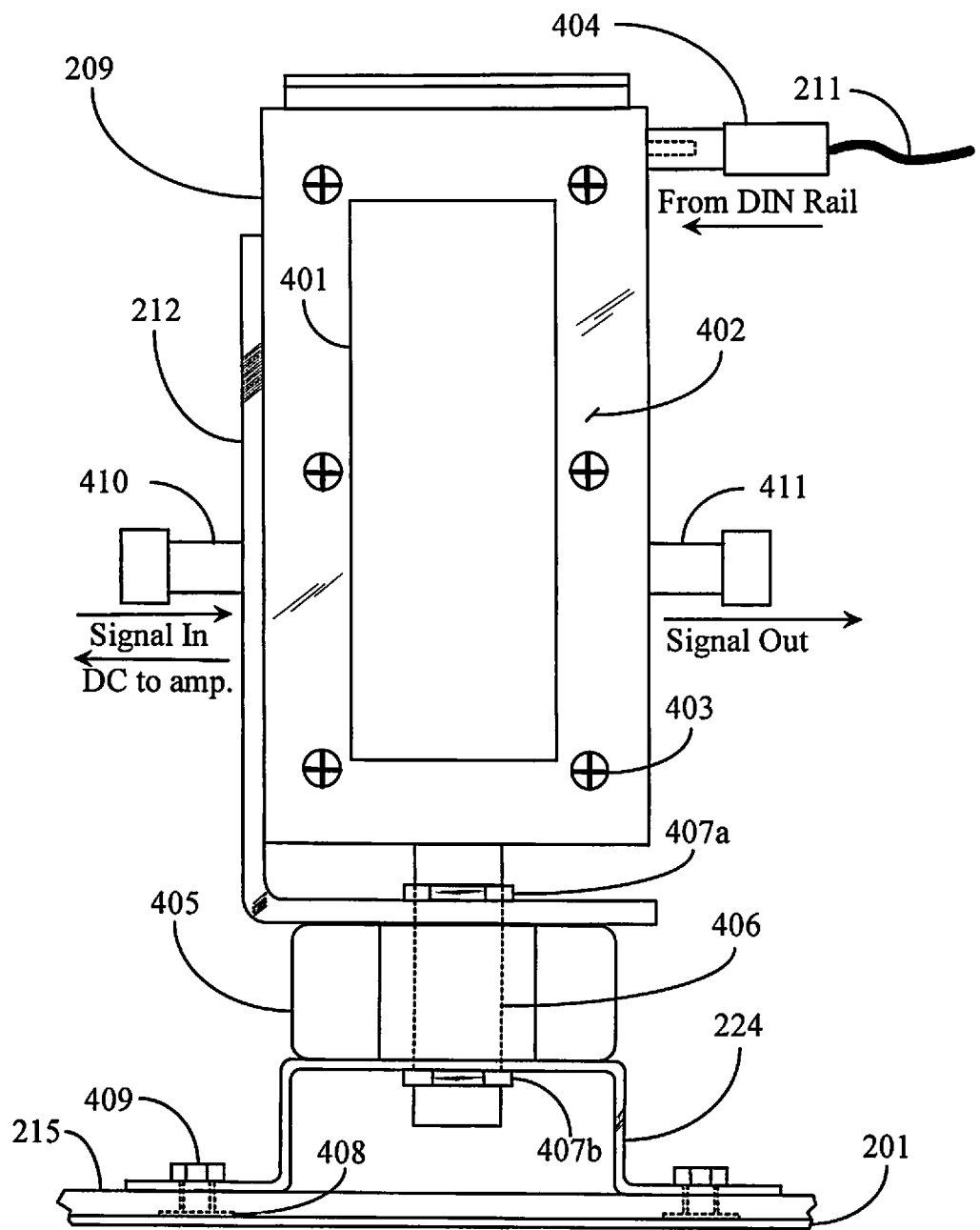
FIG. 4 is a side elevation view of one of the polyphasers of FIG. 2 mounted on a first ground bar according to an embodiment of the present invention.

FIG. 4 is a side elevation view of one of the polyphasers 209 of FIG. 2 mounted on a first grounding bar 212 according to the embodiment of the present invention described above. Polyphaser 209 includes a surge port (410 FIG. 4) for accepting the connected coaxial cable (208) coming into the box from the antenna. The first grounding bar 212 is described as an eight-hole ground bar and includes an opening through the vertical bar wall providing relief for the cable connection into the polyphaser. Polyphaser 209 includes a coaxial DC input port 404 that is wired (wire 211 FIG. 2) to the DIN power supply module 210 (FIG. 2).

In this implementation, DC current is inserted by the polyphaser into the coaxial cable (208) leading to the antenna. The amount of DC voltage that may be inserted by the polyphaser is in this embodiment is manually adjustable at the DIN power supply module 210 (FIG. 2). The exact implementation of DC supply to coaxial cable (antenna and or equipment) may vary somewhat according to characteristics of the equipment and antenna installations and capabilities. The exact voltage supplied and whether the voltage serves to power an optional implement (such as an amplifier, for example), may also vary without departing from the scope of the invention. In this implementation, each polyphaser inserts a voltage of 12 volts into the connected cable 208. In an alternative implementation, DC current might also, or instead, be introduced and maintained on the coaxial cables leading to the communications equipment located within the building as an indication to sensors monitoring the current that the connected polyphaser has not been tripped.

Also looking at FIG. 4, the polyphaser 209 includes a coaxial output port 411 for connection with the coaxial cable (cables 217, FIG. 2) leading into the building and hosted communications equipment. The RF signal from the antenna coaxial cable (cables 208, FIG. 2) passes through the polyphaser 209 into the output coaxial cable 411 and is separate from the DC carried over the center conductor of the cables out to the antenna in this case. Polyphaser 209 also includes a specification plate 401 and a removable face plate 402 attached to the polyphaser by SST screws 403. Polyphaser 209 is grounded to the first grounding bar 212 passively through surface contact between the polyphaser and the first grounding bar. The model number of the polyphaser 209 selected for use is in this embodiment of the invention is a DGX® DGXJ+24NFNF-A with a capacity of 800 MHz TO 2500 MHz.

As shown, the first grounding bar 212 is physically isolated from a pair mounting brackets 224 by a pair of insulative rubber cushions or spacers 405. A pair of threaded central mounting posts 406 hold the polyphaser 209 at a correct height for mounting. Lock nuts 407a and 407b may be threaded onto post 406 to tighten the mounting between the polyphaser 209 and the mounting brackets 224. It is noted herein that mounting brackets 224 rest on the layer of marine grade plywood 215. SST wood lags are used to secure the brackets down against the insulative marine grade plywood layer. In this way, any DC surge is discouraged from flowing toward and/or through the mounting brackets 224 and box 201 walls.

First grounding bar 212 is connected to the copper second grounding bar 213 by #2 AWG wires (see FIG. 2, 220a, 220b) using highly conductive silicon bronze screws 225 as previously described above. The overall conductive value of polyphaser 209 and first grounding bar 212 is less conductive than the overall conductivity of the cooper second and third grounding bars 213 and 214 respectively. Therefore, the DC surge entering a tripped polyphaser 209 is directed by path of least resistance to the highly conductive copper first and second grounding bars that are isolated (using resistive or nonconductive materials) from the constructs of the box 201 thus keeping the surge energy within the interior of the box 201, more specifically, within the first, second and third grounding bars.

Figure 5:
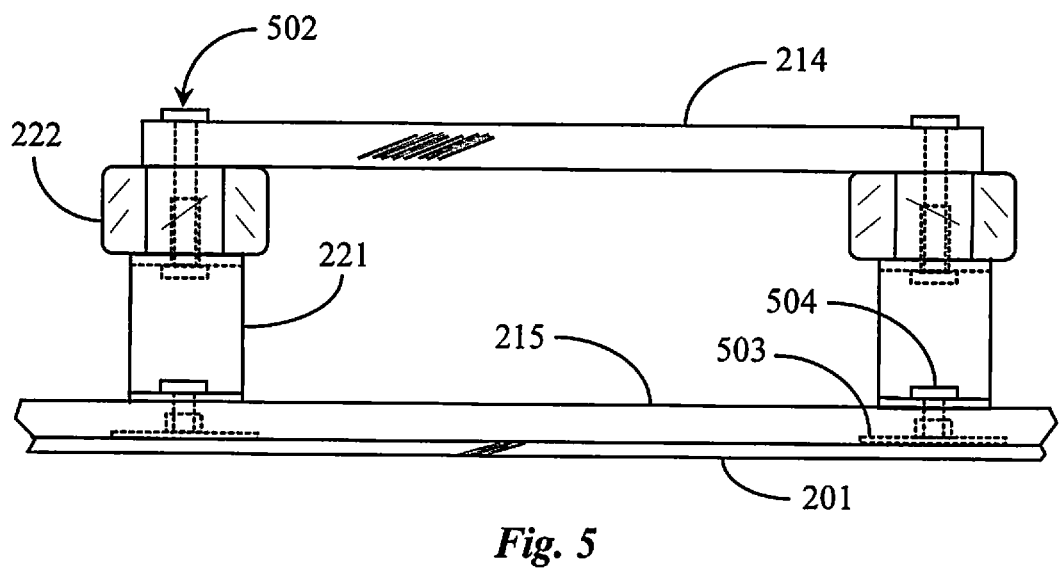
FIG. 5 is a front elevation view of one of the ground bars of FIG. 2 according to an embodiment of the present invention.

FIG. 5 is a side elevation view of the copper third grounding bar 214 of FIG. 2 according to an embodiment of the present invention. As shown, the front face of the grounding bar 214 is oriented toward the box 201 opening. Thus, the copper third grounding bar 214 is horizontally mounted to mounting brackets 221 over rubber insulative cushions 222. Hole patterns through the bar and grounding connections (wires, screws, etc.) are not illustrated in this view but are assumed present. Third grounding bar 214 may be mounted to mounting brackets 221 using SST bolt hardware 502. The rubber insulative cushions 222 serve to discourage DC surge in the grounding bar 214 from entering the mounting brackets 221 mounted on a layer of marine grade plywood 215. Bolt 502 may be a SST wood lag.

Mounting brackets 221 are mounted on the plywood layer 215 using a stainless steel wood lag. Other fastening hardware may be substituted therefor without departing from the spirit and scope of the present invention. In a preferred embodiment, the DC surge once grounded is expected to remain in the ground bars (212, 213 and 214) and isolated from other components within the box and unable to escape from the insulated confounds of the box. In this way, the communications equipment contained within the building is protected from DC surge. Further, by confining the DC surge to the grounding bars within the box 201 positioned on the building roof, any other equipment or assets not directly involved with communications and/or otherwise connected to an antenna may also be protected.

Figure 6:
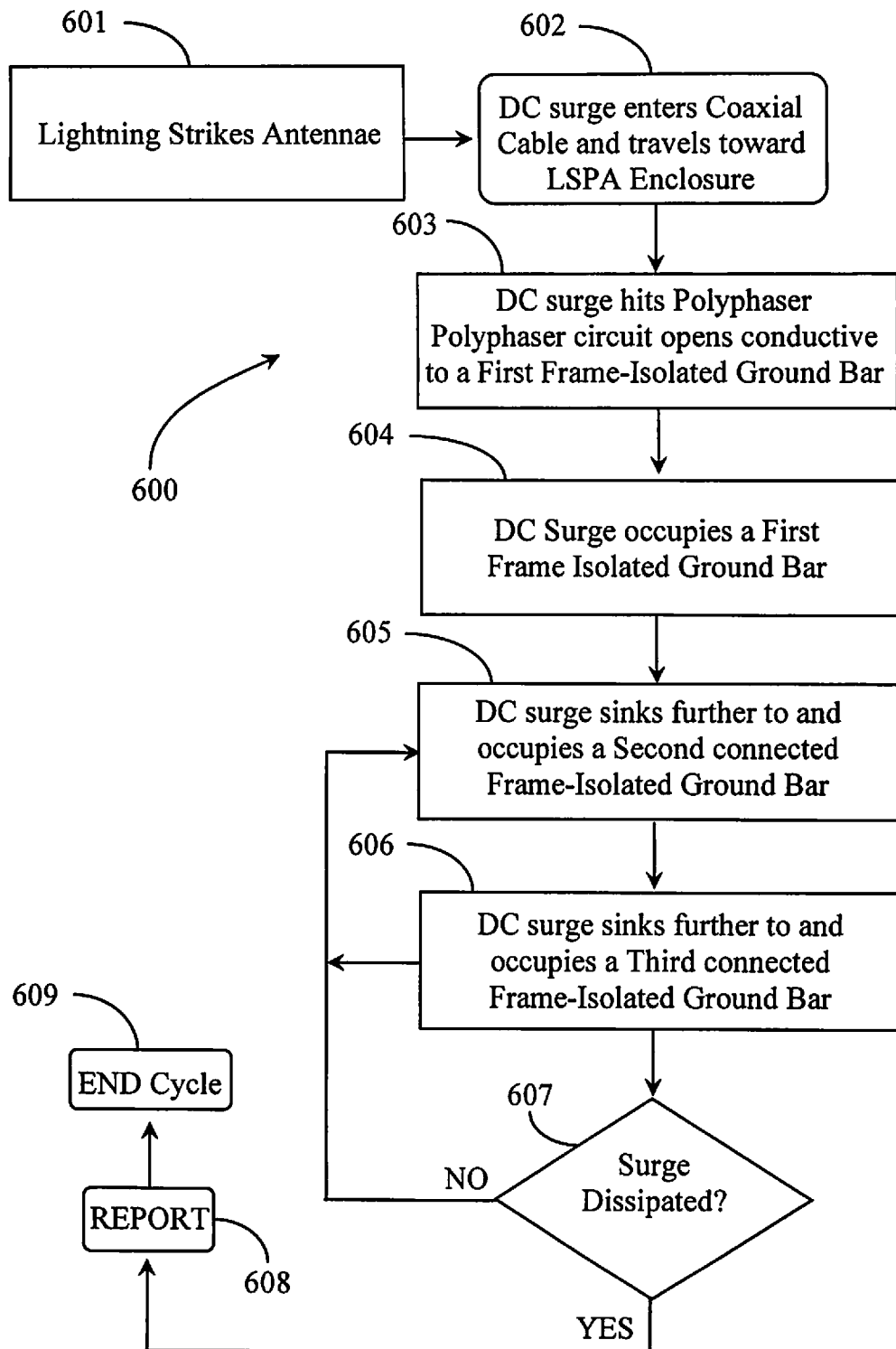
FIG. 6 is a process flow chart depicting steps for mitigating unwanted DC from a lightning strike on an antenna according to one aspect of the present invention.

FIG. 6 is a process flow chart 600 depicting steps for mitigating damage to communications equipment which might be caused by an unwanted DC surge from a lightning strike to an antenna according to one aspect of the present invention. At step 601, a lightning strike occurs and hits an antenna connected to communications equipment inside a building. Step 601 is a random event that may not be predicted but results in, step 602, a DC surge entering the coaxial cable leading to an LSPA enclosure of the present invention.

At step 603, the DC surge from the lighting strike hits an inline polyphaser causing the polyphaser to break circuit and trigger an internal process to become maximally conductive to a frame-isolated first grounding bar. The first grounding bar may not be a copper ground bar, but may be made of material less conductive than copper to promote further directional sinking along a least resistive ground path.

At step 604, the DC surge occupies the frame-isolated first grounding bar. Additional resistive measures, such as maintaining a sufficient air gap as described above, lining the inside of the enclosure with marine grade plywood, isolating power from ground utilizing insulative PVC conduit, and graduating the ground path to increasingly conductive elements (ground implements) collectively serve to prevent the lighting surge from jumping within the LSPA enclosure to cables leading directly to communications equipment within the building or from traveling through the more resistive path back of the polyphaser body into the cables leading directly to the communications equipment or from traveling from the box to the communications equipment through power and/or ground lines running from the duplex power box out to the building power and ground lines.

At step 605, the DC surge in the frame-isolated first grounding bar travels over connected AWG #6 ground wires to a frame-isolated copper second grounding bar having a higher conductivity than the first grounding bar. The first grounding bar may be made of steel or tin-plated metal material while the second grounding bar is made of pure copper or other highly conductive material, the second grounding bar also having more mass than the first grounding bar and is therefore less resistive than the first grounding bar.

At step 606, the DC surge sinks further along the path of least resistance to a frame-isolated third grounding bar over a single AWG #6 ground wire. The third grounding bar is, in one aspect of the process, identical in composition, design, and mass to the second grounding bar. However it is not specifically required that the second and third grounding bars be identical to practice the present invention as one of the copper second and third grounding bars having the mass of two smaller bars without departing from the spirit and scope of the invention. Likewise, there may be more than two copper grounding bars in array provided space within the box allows for it. Variations of size and composition of the complementary first, second and third grounding bars would be understood by persons knowledgeable of the art once the general principles of the present invention are taken into consideration.

At step 607, if DC surge has not yet dissipated, the DC surge continues back and forth over the copper second and third grounding bars. If the DC surge is dissipated at step 607 then the process may include a step 608 for reporting. At step 608, SW and a combination of sensors may determine which antenna, polyphaser, and coaxial cable path were affected by the strike in near real time as the strike occurs and is being grounded in isolation.

For example, sudden loss of RF signal on any incoming coaxial cable (i.e. cable coming into the building communications equipment from the LSPA) may indicate a strike has occurred in that line which reveals the antenna and the polyphaser involved. Secondarily, it may be determined whether a polyphaser is tripped by the sudden absence of DC voltage going into the coaxial line leading from a polyphaser to an antenna. If RF drops off a coaxial line and a SW-based DC voltage reading (DIN power supply) reveals a broken path for DC insertion into a polyphaser, then confirmation of strike and the location of strike may be assessed.

Therefore, SW running on a hardware terminal such as SW 101 (*a-c*) depicted in FIG. 1 may default to emergency re-routing routines, load balancing routines, or other information management tasks that might be previously programed and automatically executed if a strike is determined to have occurred in a specific line.

Scalability of the LSPS (lightning strike protection system) including all components mentioned with regard to FIG. 1 including the LSPA is possible within architectural allowances. For example, a smaller enclosure servicing just one antenna line running through the components of an LSPA to communications equipment may be provided where a vertical separation wall may be inserted in the LSPA between the input boot and output conduit running to the communications equipment where a single polyphaser is used. Also, a 3'×3'×12" box may service more than three lines connected to antenna though empirical evidence discovered by the inventor suggests the addition of separate LSPA boxes for servicing more antennas where three to four antennas may be serviced per box is a better option.

Figure 7:
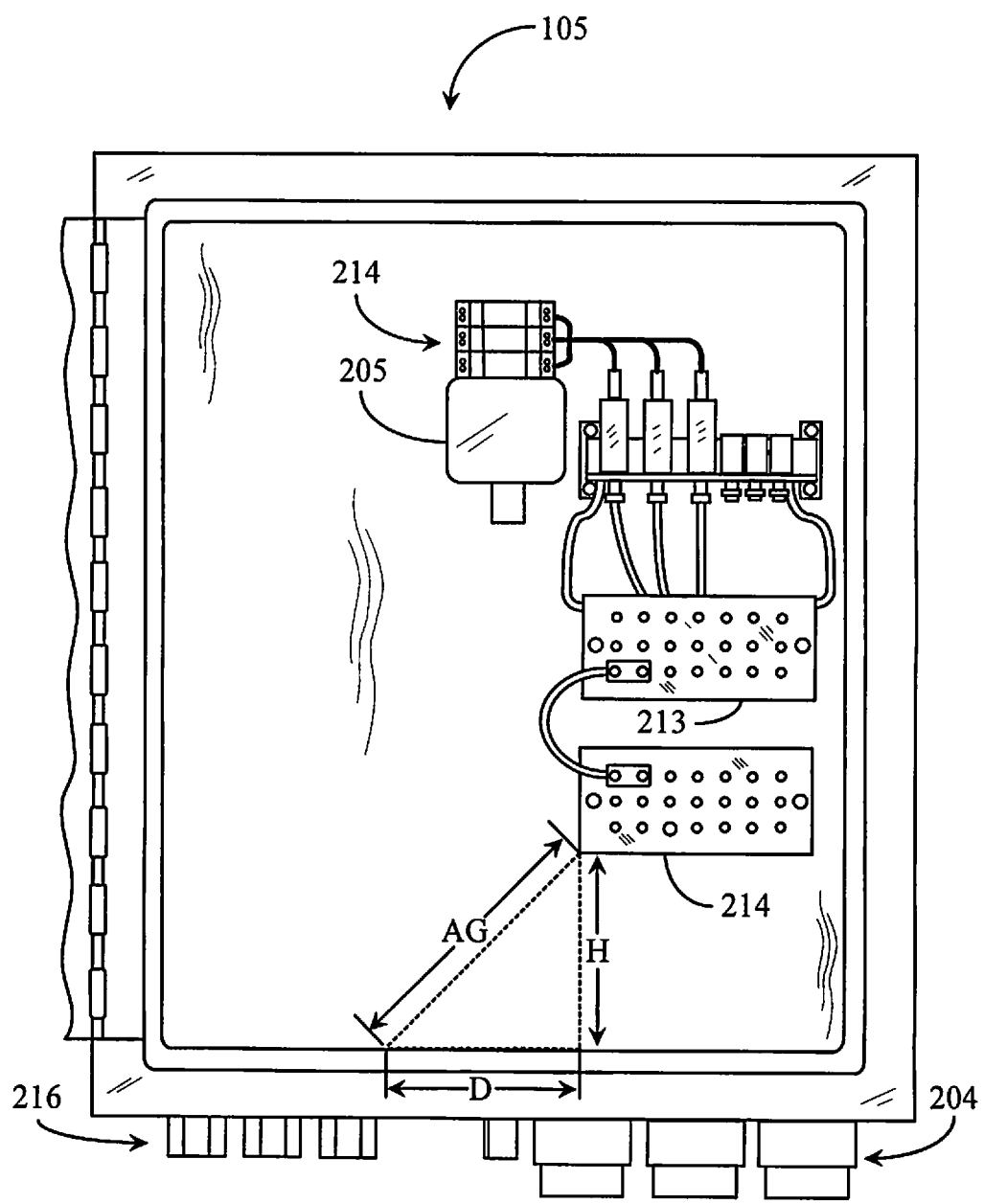
FIG. 7 is a partial overhead view of the system of FIG. 7 with some components removed for clarity and depicting geometry supporting a DC surge gap from ground to equipment.

FIG. 7 is a partial overhead view of LSPA 105 of FIG. 2 with some components removed for clarity and further depicting component geometry needed to prevent and potential DC surge jump from grounding bars to cables leading directly to communications equipment. When a polyphaser circuit breaks, the polyphaser redirects the surge to a local first grounding bar and then into copper second and third grounding bars 213 and 214 respectively. The power of a surge that exceeds the resistance capacity of a polyphaser may also inadvertently jump through air to a conduit such as an output cable leading to the building communications equipment which equipment is meant to be protected from such surge. Therefore, a sufficient distance through air space is provided within the LSPA enclosure between the potential source of a surge jump to the nearest output coaxial cable, in this example the distance between that edge of the third grounding bar which is closest to the egress location of the cables exiting the LSPA.

A horizontal dimension D is maintained from the proximal edge line of rectangular grounding bars 213 and 214. Distance D may be approximately 8 inches or so in length. A vertical dimension H is maintained between the lower horizontal edge of copper second grounding bar 214. Height H may also be 8 inches or so forming a right triangle with a longer hypotenuse air gap (AG) dimension (diagonal) established between the closest point of the grounding bar array and the closest output coaxial cable running out of the LSPA to building communications equipment. The distance of AG based on the D and H leg of the triangle is about 12 inches of empty air. The inventor deems the distance sufficient to provide for enough resistance (through air) to discourage a jump of the DC surge from the grounding bar array into the coaxial output cables running toward the protected building communications equipment.

In this view the ground wires from antennas, referenced herein as #6 AWG ground wires 701 are illustrated incoming through each boot 204 and connected to grounding bar 214 by connector 702 and silicon bronze screws 225. These wires are not depicted in FIG. 2 to save space in that Fig. but are assumed in all embodiments using passive or active antennas whereby each antenna is grounded to the grounding array within the Hoffman enclosure.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

What is claimed is:

1. A lightning surge dissipation apparatus for mounting to a building exterior and for connection with coaxial cable extending from communications antenna located on the building exterior and with coaxial cable extending to communications equipment located within the building interior, the apparatus comprising:
- an electrically insulated enclosure having top, bottom, right, left, front, and back side walls, each wall having an interior and exterior surface, the front side wall having an opening configured for closure by a door, the enclosure defining an electrically insulated interior space;
- an electrically insulated door configured for opening and closing the opening, the door mounted to the exterior surface of the front side of the enclosure using a hinge;
- an insulated universal power box disposed within the interior space of the enclosure, the power box containing a power supply apparatus and connecting electrical and grounding wires which extend from the power supply apparatus mounted within the power box through an insulated conduit, the conduit connected with the power box and extending downward through the interior space of the enclosure and connected with an insulated outlet connector at the bottom side of the enclosure;
- at least one DIN rail power supply module mounted with the interior surface of the back wall of the enclosure, the power supply module connected with and drawing power from the power supply apparatus;
- at least one high capacity polyphaser mounted on a first grounding bar, the first ground bar mounted with and insulated from the interior surface of the back side of the enclosure, the at least one polyphaser passively grounded to the first grounding bar, polyphaser having a power inlet connected with and accepting power from the DIN rail power supply module, an incoming coaxial cable port configured for connecting with an incoming coaxial cable, and an outgoing coaxial cable port configured for connecting with an outgoing coaxial cable;
- a second grounding bar mounted to and insulated from the interior back side surface of the enclosure, the second grounding bar connected with the first ground bar by ground wire, the second grounding bar positioned separate from but adjacent to the first grounding bar, the second grounding bar having substantially better conductive properties including mass than the first grounding bar;
- a third grounding bar mounted to and insulated from the interior back side surface of the enclosure, the third grounding bar connected with the second grounding bar by ground wire, the third grounding bar positioned separate from but adjacent to the second grounding bar, the third grounding bar having substantially better conductive properties including mass than the first grounding bar;
- a ground wire connected with the third grounding bar at one end, extending through an insulated opening in the bottom side of the enclosure;
- a ground wire connected with the third grounding bar at one end and extending to and connected with the interior surface of the door;
- at least one incoming coaxial cable extending from one or more communications antenna mounted on a building exterior and inserted through insulated boots located at one wall of the enclosure, the inserted end of the input cable attached to the incoming coaxial cable port the polyphaser;
- at least one outgoing coaxial cable connected to the outgoing coaxial cable port of the polyphaser at one end, the opposite end of the outgoing coaxial cable extending through an insulated connector at one wall of the enclosure;
- wherein upon a lightning surge entering the enclosure through the input coaxial cable, the polyphaser breaks circuit at capacity threshold, directing the surge into the first grounding bar, the surge then traveling from the first grounding bar to the second grounding bar, and from the second grounding bar to the third grounding bar thus substantially and effectively dissipating the surge within the enclosure and shielding the surge from the outgoing coaxial cable leading to the communications equipment.

2. The lighting surge dissipation apparatus of claim 1, mounted on an insulative surface or structure.

3. The lighting surge dissipation apparatus of claim 1, wherein electrical insulation of the enclosure includes incorporation of one or a combination of a marine grade wood lining for the inside surfaces of the enclosure, rubber boots for coaxial cables and ground to pass through from antenna, and rubber standoff cushions for isolating ground bars from the mounting hardware of the enclosure.

4. The lighting surge dissipation apparatus of claim 1, wherein the at least one polyphaser is configured for an active antenna injecting DC current over the coaxial cable to the antenna to power signal amplification equipment at the antenna.

5. The lighting surge dissipation apparatus of claim 1, wherein the at least one polyphaser is configured for a passive antenna with no signal amplification equipment and no DC current is injected.

6. The lighting surge dissipation apparatus of claim 1, further including an insulative vertical barrier separating the grounding side of the enclosure and the equipment cable output side of the enclosure.

7. The lighting surge dissipation apparatus of claim 1, wherein the ground wire connected to the third grounding bar is further connected to an electrical panel or building ground allowing a small amount of surge to dissipate over the ground wire to building ground.

8. The lightning surge dissipation apparatus of claim 1, wherein the one or more polyphasers are configured to cut off RF signal upon being tripped by a lightning surge to allow detection of a lightning strike to one or more antenna by communication systems connected with the lightning surge apparatus.

9. The lightning surge dissipation apparatus of claim 8, wherein the communication system determines whether an antenna connected with the apparatus has been struck by lightning by detecting a lack of DC current flowing from a tripped polyphaser to a struck antenna.

10. The lightning surge dissipation apparatus of claim 8 wherein the one of more polyphasers are configured to cut off DC current flowing from the one or more polyphaser when the one or more polyphasers are tripped by a lightning surge received through the incoming coaxial cable.

11. The lightning surge dissipation apparatus of claim 8 wherein the communication system is configured, upon determining that the one or more polyphasers have been tripped, to redirect the receipt of RF signals that would have otherwise been received through struck antenna.

12. The lightning surge dissipation apparatus of claim 1, wherein the inside surface of the enclosure and door of the enclosure is overlaid with marine grade dry wood that functions as an electrically insulative surface.

13. The lightning surge dissipation apparatus of claim 1, wherein a small DC voltage is inserted into the outgoing coaxial cables leading from the one or more polyphasers to communications equipment as an indication of a healthy polyphaser.

14. The lightning surge dissipation apparatus of claim 1, wherein the inside surface of the enclosure is stainless steel and the means for mounting internal components to the interior back side of the enclosure are welded to the stainless steel to maintain the electrically insulative integrity of the enclosure.

15. The lightning surge dissipation apparatus of claim 1, wherein the relative dimensions of the enclosure and location of the components contained therein allows a sufficient amount of electrically insulative air space between the grounding bars and the outgoing coaxial cables to prevent a lightning surge from jumping from the grounding bars to the outgoing coaxial cables.

16. The lightning surge dissipation apparatus of claim 1, wherein the insulative universal power box is provided as a universal kit containing different optional power connectors and components appropriate to meet code in differing regions within the United States.

* * * * *